United States Patent
Lu et al.

(10) Patent No.: US 11,429,424 B2
(45) Date of Patent: Aug. 30, 2022

(54) FINE-GRAINED APPLICATION-AWARE LATENCY OPTIMIZATION FOR VIRTUAL MACHINES AT RUNTIME

(71) Applicant: VMware, Inc., Palo Alto, CA (US)

(72) Inventors: Xunjia Lu, Los Altos, CA (US); Haoqiang Zheng, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 103 days.

(21) Appl. No.: 16/936,289

(22) Filed: Jul. 22, 2020

(65) Prior Publication Data
US 2022/0027183 A1    Jan. 27, 2022

(51) Int. Cl.
*G06F 9/455*    (2018.01)
*G06F 9/48*    (2006.01)

(52) U.S. Cl.
CPC ...... *G06F 9/45558* (2013.01); *G06F 9/45545* (2013.01); *G06F 9/4881* (2013.01)

(58) Field of Classification Search
CPC . G06F 9/45558; G06F 9/45545; G06F 9/4881
See application file for complete search history.

(56) References Cited

U.S. PATENT DOCUMENTS

| | | | |
|---|---|---|---|
| 10,061,610 B2 | 8/2018 | Zheng et al. | |
| 10,452,572 B2 | 10/2019 | Lu et al. | |
| 2007/0083871 A1* | 4/2007 | McKenney | G06F 9/4887 718/105 |
| 2015/0055499 A1* | 2/2015 | Zheng | G06F 13/24 370/252 |
| 2015/0058846 A1* | 2/2015 | Zheng | G06F 9/5027 718/1 |
| 2017/0024231 A1* | 1/2017 | Riel | G06F 9/5038 |
| 2018/0101486 A1* | 4/2018 | Lu | G06F 9/5033 |
| 2020/0201663 A1* | 6/2020 | Das | G06F 9/50 |
| 2021/0117219 A1* | 4/2021 | Iwasa | G06F 11/2023 |

OTHER PUBLICATIONS

Red Hat, Inc. "33.8: Setting KVM Processor Affinities," Red Hat Enterprise Linux 5, Virtualization Guide, 2020, 4 pages, retrieved Jul. 22, 2020 from https://access.redhat.com/documentation/en-us/red_hat_enterprise_linux/5/html/virtualization/ch33s08.

* cited by examiner

*Primary Examiner* — Dong U Kim
(74) *Attorney, Agent, or Firm* — Kim & Stewart LLP

(57) ABSTRACT

A method of selectively assigning virtual CPUs (vCPUs) of a virtual machine (VM) to physical CPUs (pCPUs), where execution of the VM is supported by a hypervisor running on a hardware platform including the pCPUs, includes determining that a first vCPU of the vCPUs is scheduled to execute a latency-sensitive workload of the VM and a second vCPU of the vCPUs is scheduled to execute a non-latency-sensitive workload of the VM and assigning the first vCPU to a first pCPU of the pCPUs and the second vCPU to a second pCPU of the pCPUs. A kernel component of the hypervisor pins the assignment of the first vCPU to the first pCPU and does not pin the assignment of the second vCPU to the second pCPU. The method further comprises selectively tagging or not tagging by a user or an automated tool, a plurality of workloads of the VM as latency-sensitive.

14 Claims, 6 Drawing Sheets

| | | | | | | | | |
|---|---|---|---|---|---|---|---|---|
| vCPU$_0$ | VM.VcpuConfig(latencySensitivity = highLatency) | | | | | | | ← VM3 |
| vCPU$_0$ | VM.VcpuConfig(latencySensitivity = highLatency) | | | | | | | ← VM2 |
| vCPU$_0$ | VM.VcpuConfig(latencySensitivity = highLatency) | | | | | | | ← VM1 |
| vCPU$_1$ | VM.VcpuConfig(latencySensitivity = highLatency) | | | | | | | |
| vCPU$_2$ | VM.VcpuConfig(latencySensitivity = normalLatency) | | | | | | | |
| vCPU$_3$ | VM.VcpuConfig(latencySensitivity = normalLatency) | | | | | | | |
| vCPU$_4$ | VM.VcpuConfig(latencySensitivity = normalLatency) | | | | | | | |
| vCPU$_5$ | VM.VcpuConfig(latencySensitivity = highLatency) | | | | | | | |
| vCPU$_K$ | | | | | | | | |

FIG. 3B

FINE-GRAINED APPLICATION-AWARE LATENCY OPTIMIZATION FOR VIRTUAL MACHINES AT RUNTIME

BACKGROUND

A software-defined networking architecture includes an application plane, a control plane, and a data plane with application programming interfaces between each plane. The application plane runs applications such as security applications, network applications, and business applications. The control plane maps application layer service requests into specific commands and directives to the data plane and supplies the applications in the application plane with information about data plane topology and activity. The data plane includes network devices, such as physical and virtual switches and routers, each of which has an input queue and forwarding table and an output queue.

One implementation of a data plane is to place the network devices of the data plane into a virtual machine running a guest operating system, GOS. However, this places severe service demands on the virtual machine (VM). The VM sometimes must carry out the data plane functions with high throughput and low latency. For example, a data plane for a telecommunications workload has such a severe service requirement.

To meet these demands, each of the virtual CPUs (vCPUs) of the virtual machine running the data plane is assigned to dedicated physical CPUs (pCPUs.) However, such a configuration is inefficient because, regardless of whether all of the vCPUs of the VM are running critical tasks, they are still assigned to dedicated pCPUs. These assignments mean that some of the pCPUs are running non-critical tasks when they otherwise could be running critical tasks of a different virtual machine running another data plane.

Accordingly, more efficient use of physical CPUs is needed to improve the number of VMs that can run on a host computer while maintaining the high performance of those VMs.

SUMMARY

In one or more embodiments, to improve the use of pCPUs on a host computer system, each vCPU is selectively tagged based on an application requirement. A scheduler in a hypervisor running on the host computer recognizes the tags and, as part of the scheduling algorithm, assigns the tagged vCPUs to pCPUs such that the reassignment of the tagged vCPUs is not permitted if the tag indicates that the vCPU is running a time-critical workload and is permitted otherwise.

A method of selectively assigning vCPUs of a VM to pCPUs, where execution of the VM is supported by a hypervisor running on a hardware platform including the pCPUs, includes the steps of determining that a first vCPU of the vCPUs is scheduled to execute a latency-sensitive workload of the VM and a second vCPU of the vCPUs is scheduled to execute a non-latency-sensitive workload of the VM, assigning the first vCPU to a first pCPU of the pCPUs and the second vCPU to a second pCPU of the pCPUs, and causing the execution of the latency and non-latency sensitive workloads on the first vCPU and the second vCPU respectively. A kernel component of the hypervisor pins the assignment of the first vCPU to the first pCPU and does not pin the assignment of the second vCPU to the second pCPU.

Further embodiments include a computer-readable medium containing instructions that, when executed by a computing device, cause the computing device to carry out one more aspects of the above method, and a system comprising memory and a processor configured to carry out one or more aspects of the above method.

BRIEF DESCRIPTION OF FIGURES

FIG. 3B depicts the latency-sensitive array, according to an embodiment.

DETAILED DESCRIPTION

Described herein are embodiments that assign vCPUs of a VM to pCPUs according to the workload of the specific vCPU rather than the entire VM. The assignments are performed by having a vCPU of a VM tagged as to the type of workload, latency-sensitive, or non-latency sensitive, that the vCPU is to run. Tagging occurs at the user level or by an administrative tool that indicates the type of workload. This tagging information is then provided to a scheduler, which determines whether the vCPU is running or not. If the vCPU is not running, then the scheduler makes an assignment of the vCPU to take effect when the vCPU enters a running state. If the vCPU is already running, then the scheduler makes an assignment of the vCPU while the vCPU is running (e.g., at runtime). Thus, the tagging not only allows the assignments of vCPUs to pCPUs to be based on the latency sensitivity of the workload but also to be dynamically alterable at runtime. Being dynamically assignable at runtime furthers the goal of taking into account the latency-sensitivity of the workloads of the vCPUs because the scheduler can be highly responsive to the latency-sensitivity tagging.

Figure 1:
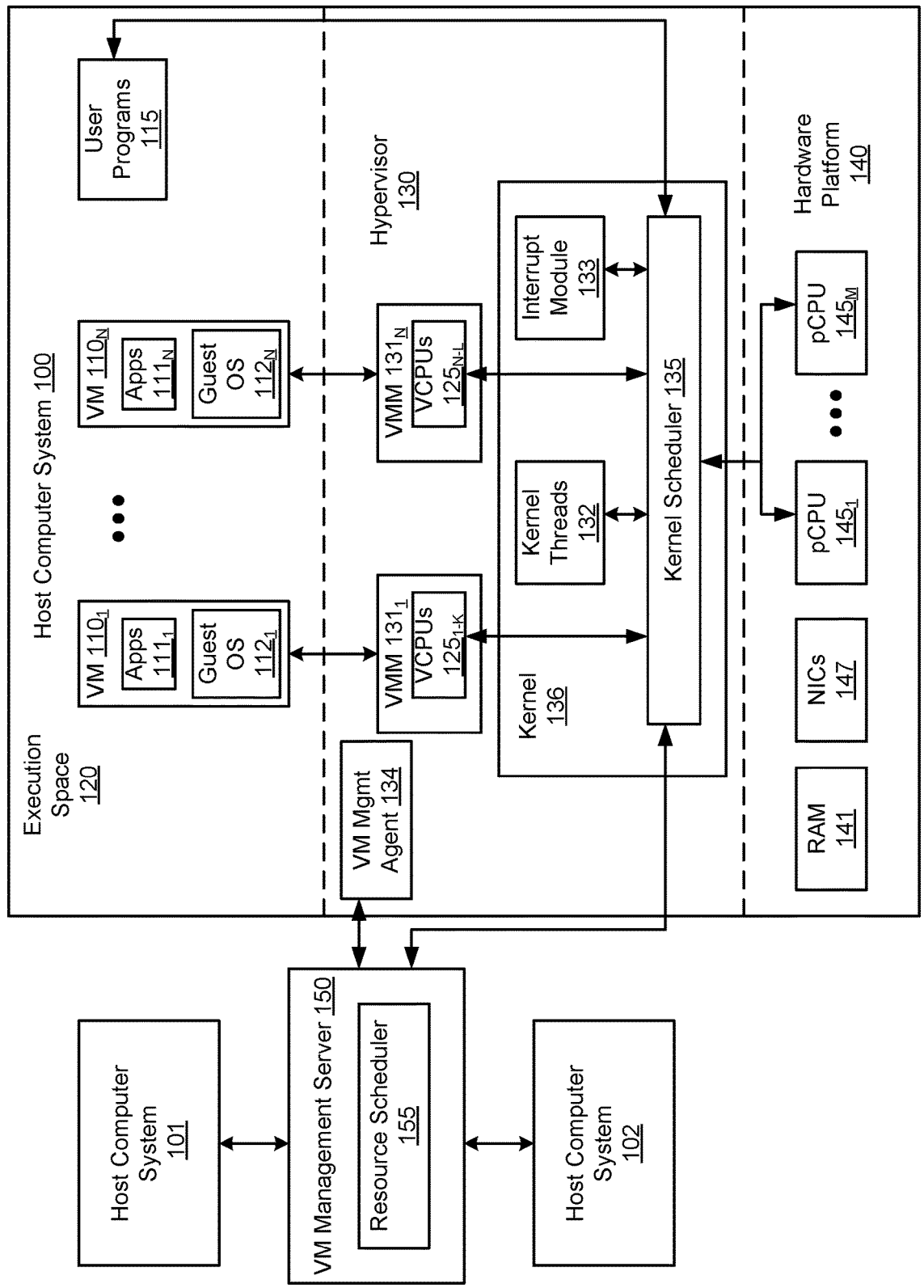
FIG. 1 depicts a representative host computer system in which embodiments may be implemented.

FIG. 1 depicts a virtualized computing environment in which one or more embodiments may be implemented. As shown, the computing environment includes a host computer system 100 and a virtual machine (VM) management server 150. VM management server 150 communicates with host computer system 100 over a local connection or, alternatively, over a remote network connection (not shown).

Host computer system 100 is, in embodiments, a general-purpose computer that supports the execution of an operating system and one more application programs therein. In order to execute the various components that comprise a virtualized computing platform, host computer system 100 is typically a server-class computer. However, host computer system 100 may also be a desktop or laptop computer. As shown, host computer system 100 is logically divided into three different components. First, execution space 120 supports the execution of user programs 115 as opposed to kernel programs. User programs 115 are non-privileged, meaning that they cannot perform certain privileged functions, such as executing privileged instructions or accessing certain protected regions of system memory. Among the programs that execution space 120 supports are virtual machines and user programs.

Virtual machines are software implementations of physical computing devices and execute programs much like a physical computer. In embodiments, a VM implements, in software, a computing platform that supports the execution of software applications under the control of a GOS. As such, VMs typically emulate a particular computing architecture. In FIG. 1, execution space 120 includes VMs $110_1$-$110_N$. Each VM $110_1$-$110_N$ shown supports the execution of one or more applications $111_1$-$111_N$, each of which executes under the control of a particular GOS $112_1$-$112_N$. Applications $111_1$-$111_N$ are user (non-kernel) programs, such as, for example, word processors or spreadsheet programs. Each of the depicted GOSs $112_1$-$112_N$ may be one of the well-known commodity operating systems, such as any of the versions of the Windows® operating system, the Linux® operating system, or MacOS® X. It should be understood that the applications and GOS may vary from one VM to another. Thus, applications $111_1$ in VM $110_1$ may include Microsoft's Word® and Excel® applications running under the control of Windows® 7 as GOS $112_1$. By contrast, application $111_N$ in VM $110_N$ may include the Safari® web browser running under the control of MacOS® X as GOS $112_N$.

In addition to VMs $110_1$-$110_N$, execution space 120 includes one or more user programs 115. In embodiments, user programs 115 are software components that execute independently of any VM. Examples of user programs 115 include utilities that perform various system-oriented functions, such as facilitating communication with the kernel, providing directory services, and the like. Such programs, like VMs, execute at the user level, meaning that these programs cannot perform certain privileged (kernel-level) functions. As shown, each of VMs $110_1$-$110_N$ and user programs 115 communicates with a hypervisor component, referred to herein as hypervisor 130.

Hypervisor 130 provides the operating system platform for running processes on host computer system 100. Hypervisor 130 controls all hardware devices within host computer system 100 and manages system resources for all applications running therein. Among the core functions that hypervisor 130 provides are console services, file system services, device drivers, and resource scheduling. Further, hypervisor 130 implements software components that provide for the instantiation of one or more virtual machines on the host computer.

As shown, hypervisor 130 includes virtual machine monitors (VMMs) $131_1$-$131_N$. Each VMM $131_1$-$131_N$ corresponds to an executing VM $110_1$-$110_N$. Thus, VMM $131_1$ corresponds to VM $110_1$, VMM $131_2$ to VM $110_2$, and so on. Each VMM $131_1$-$131_N$ is a software layer that provides a virtual hardware platform to the GOS for the corresponding VM. It is through a particular VMM $131_1$-$131_N$ that a corresponding VM accesses services provided by the kernel component of hypervisor 130 (shown in FIG. 1 as kernel 136). Among the functions carried out by kernel 136 are memory management, providing networking and storage stacks, and process scheduling.

Each VMM $131_1$-$131_N$ implements a virtual hardware platform for the corresponding VM $110_1$-$110_N$. Among the components of the implemented virtual hardware platform are one or more virtual central processing units (or vCPUs) $125_{1-K}$ to $125_{N-L}$. Thus, VMM $131_1$ implements a first set of vCPUs $125_1$-K, VMM $131_2$ a second set of vCPUs $125_{2-J}$, and so on. Each vCPU $125_{1-K}$ to $125_{N-L}$ appears to be a physical CPU from the standpoint of the applications 111 and the GOS $112_1$-$112_N$ that run in the corresponding VM 110. In this way, a GOS that runs within a VM may schedule and dispatch processes for execution on one or more vCPUs in the same way that an operating system that runs directly on a host computer system schedules and dispatches processes for execution on pCPUs. However, from the standpoint of hypervisor 130 (which, in typical embodiments, executes directly on host computer system 100), each vCPU 125 is a process to be scheduled and dispatched on a pCPU of host computer system 100. In embodiments, a pCPU is either a physical processor core or a logical processor on a CPU with hyper-threading enabled.

In one or more embodiments, kernel 136 serves as a liaison between VMs $110_1$-$110_N$ and the physical hardware of host computer system 100. Kernel 136 is a central operating system component and executes directly on host computer system 100. In embodiments, kernel 136 allocates memory, schedules access to pCPUs, and manages access to physical hardware devices connected to host computer system 100.

As shown, kernel 136 executes one or more kernel threads 132. Kernel threads 132 are processes that perform operating system functions, such as memory and device management, and execute in a privileged mode (as opposed to user programs 115, described earlier, which execute in a non-privileged mode). Kernel 136 also includes an interrupt module 133. According to embodiments, interrupt module 133 (which may also be referred to as an interrupt handler) comprises one or more operating system functions, whose execution is triggered by the detection of an interrupt, such as those generated by hardware devices. Interrupt module 133 includes several types of interrupt handlers, which respond to interrupts generated by a particular hardware device or software module. Each interrupt handler in interrupt module 133 runs as a kernel process, much like kernel threads 132.

Kernel 136 also includes a kernel scheduler 135. Kernel scheduler 135 is responsible for scheduling tasks for execution on the pCPUs of host computer system 100. It should be noted that all tasks that execute on host computer system 100 must share its underlying hardware resources. Hardware resources include random access memory (RAM), external storage, and processing time on the pCPUs. Thus, the tasks that kernel scheduler 135 schedules for processing include vCPUs $125_{1-K}$ to $125_{N-L}$ (which are the vCPUs of executing VMs), user programs 115, kernel threads 132, and interrupt handlers that execute as part of interrupt module 133.

FIG. 1 also depicts hardware platform 140, which is another component of host computer system 100. Hardware platform 140 includes all physical devices, channels, and adapters of computer host computer system 100. In embodiments, hardware platform 140 includes network adapters (not shown) for network communication, as well as host bus adapters (HBAs) (not shown), which enable communication to external storage devices. In addition, hardware platform 140 includes the pCPUs $145_1$-$145_M$ of host computer system 100. As shown in FIG. 1, host computer system 100 has M pCPUs $145_1$-$145_M$, and kernel scheduler 135 schedules and dispatches tasks for execution on one or more pCPUs $145_1$-$145_M$. Hardware platform 140 also includes a random access memory (RAM) 141, which, among other things, stores programs currently in execution, as well as data required for such programs.

In order to support the configuration, identification, and scheduling changes needed for executing virtual machines and load balancing the virtual machines across host computer systems, the embodiment depicted in FIG. 1 includes a VM management server 150. VM management server 150 is, in embodiments, a server application executing either within host computer system 100 or (as shown in FIG. 1) remotely from host computer system 100. Embodiments of VM management server 150 provide an interface (such as a graphical user interface (or GUI)) through which a system administrator may define, configure, and deploy virtual machines for execution on one or more host computer systems. As shown, VM management server 150 includes a resource scheduler 155 that is specifically responsible for placing and load balancing VMs across the host computers (e.g., host computer systems 100, 101, and 102).

As shown in FIG. 1, VM management server 150 communicates with host computer system 100, either through a direct local connection or over a computer network. In order to facilitate such communication, VM management agent 134 executes on host computer system 100. Although VM management agent 134 is not part of kernel 136, embodiments of the VM management agent 134 run within hypervisor 130. However, in other embodiments, VM management agent 134 may run as a user program within execution space 120. It should be noted that the processes of VM management agent 134 are also scheduled for execution by kernel scheduler 135. VM management agent 134 receives instructions from VM management server 150 and carries out tasks on behalf of VM management server 150. Among the tasks performed by VM management agent 134 are configuration and instantiation of VMs.

Figure 2:
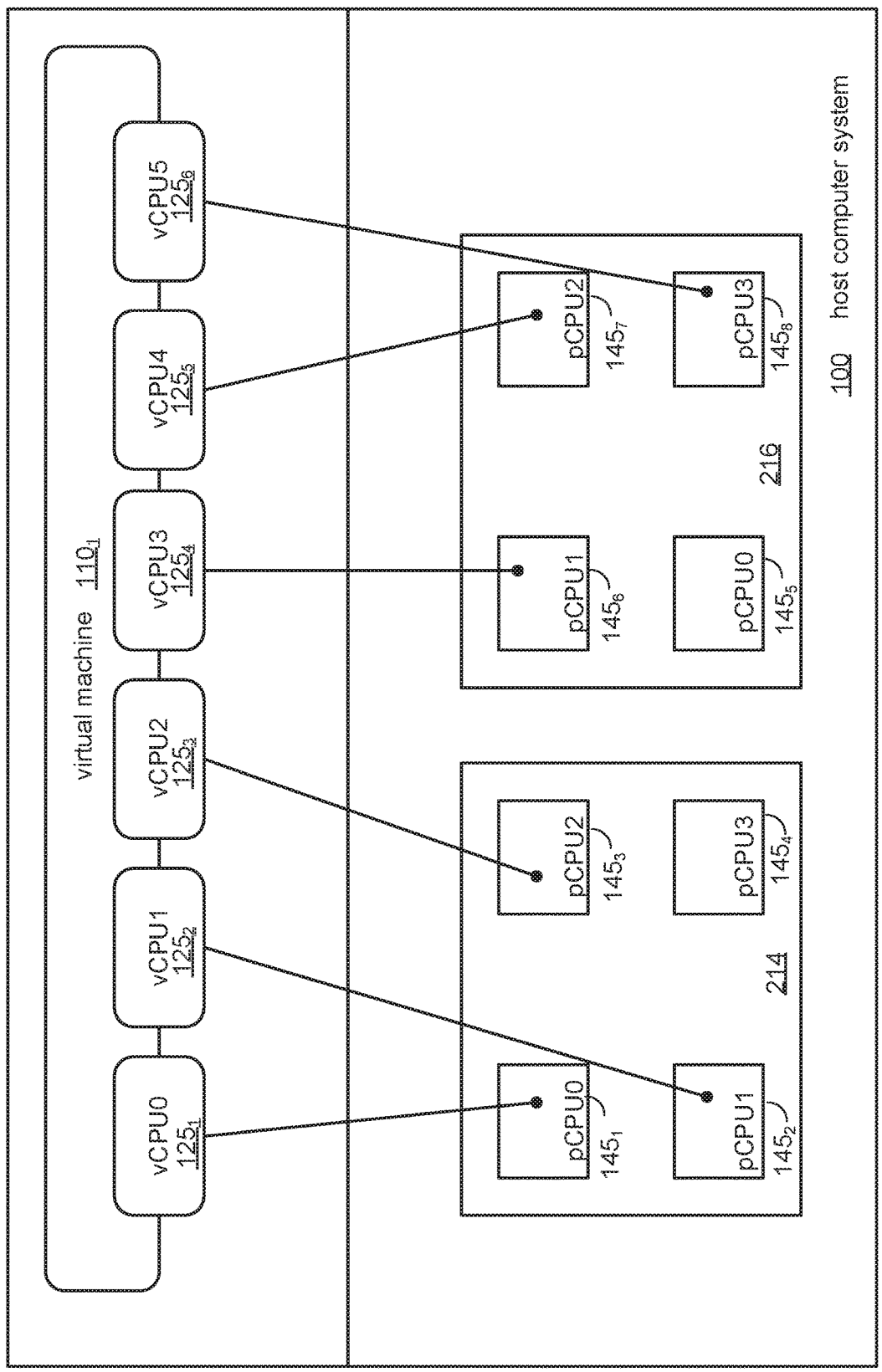
FIG. 2 depicts an example assignments of vCPUs to pCPUs for a virtual machine.

FIG. 2 depicts an example assignment of vCPUs to pCPUs for a virtual machine. As shown, a VM $110_1$ has six vCPUs. The kernel scheduler makes assignments, which do not allow reassignment, according to Table 1.

TABLE 1

| vCPU | Socket | pCPU | reassignment allowed? |
|---|---|---|---|
| vCPU0 $125_1$ | 214 | pCPU0 $145_1$ | No |
| vCPU1 $125_2$ | 214 | pCPU1 $145_2$ | No |
| vCPU2 $125_3$ | 214 | pCPU2 $145_3$ | No |
| vCPU3 $125_4$ | 216 | pCPU1 $145_6$ | No |
| vCPU4 $125_5$ | 216 | pCPU2 $145_7$ | No |
| vCPU5 $125_6$ | 216 | pCPU3 $145_8$ | No |

These assignments thus implement optimization of latency at the VM-level (coarse-grained). Such assignments do not account for latency-sensitive workloads of individual vCPUs in the VM.

Figure 3A:
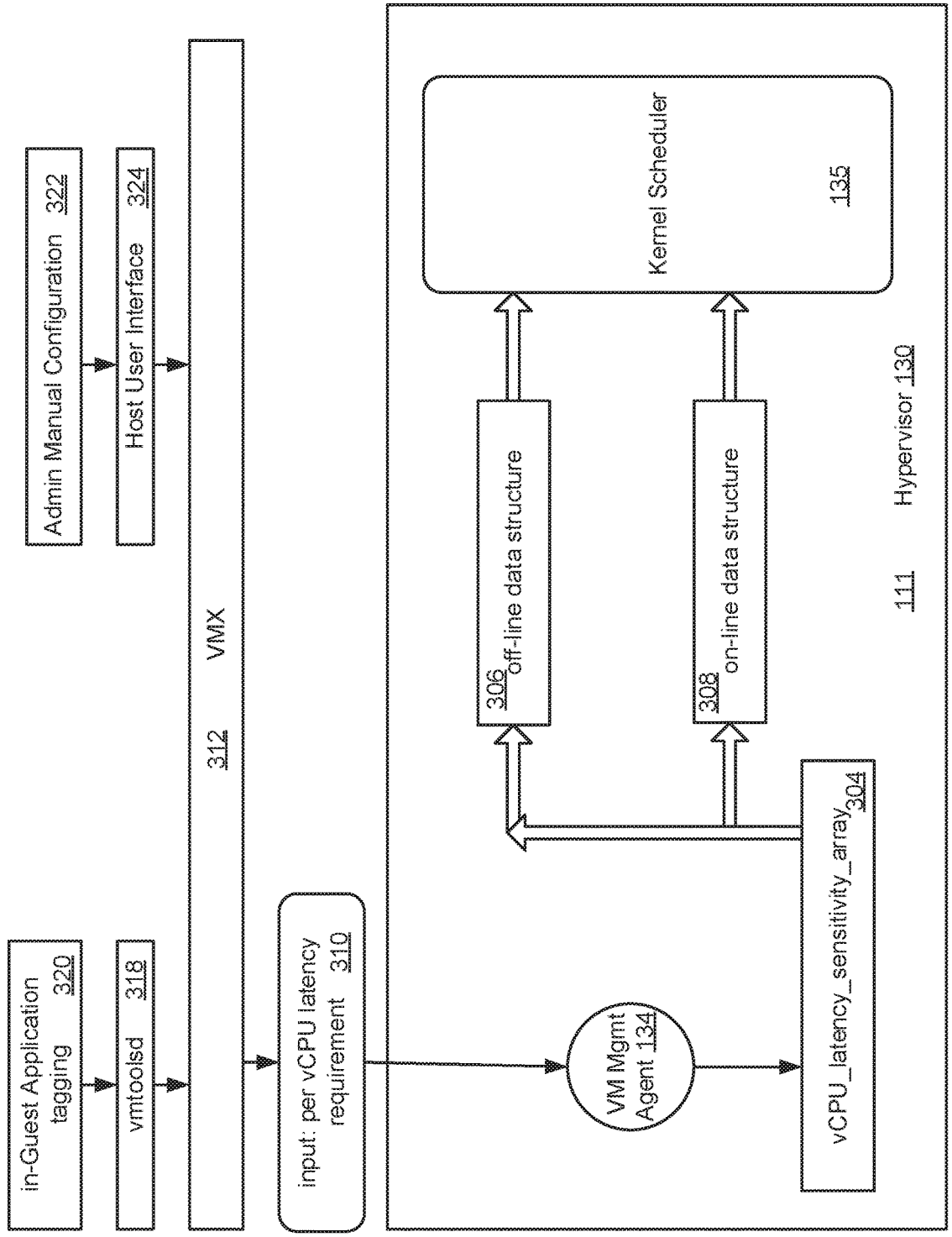
FIG. 3A depicts a diagram of the flow of information in the tagging of vCPUs, according to an embodiment.

FIG. 3A depicts a diagram of the flow of information in the tagging of vCPUs, according to an embodiment. The figure includes a tagging program 320, which may be either a guest operating system or an application program running thereon, which tags processes (also called worlds) in a VM as latency-sensitive or not. The guest operating system or application program observes the processes that are scheduled to run on the VM and, based on the type of process, determines whether the process is latency-sensitive. For example, the application program or guest operating system may determine that the functions of a data plane, mentioned above, are latency-sensitive, while other processes also running on the VM are not.

Still referring to FIG. 3A, tagging program 320 operates through a communication channel that is coupled to a tool daemon (vmtoolsd) 318, which receives the tagging information. The communication channel permits tagging program 320 to inform the hypervisor of a change in latency requirement while processes are running on the VM (i.e., at runtime). An alternative input for tagging information is an admin manual configuration 322 that is coupled to a host user interface 324, where the admin manual configuration 322 allows the user to tag vCPUs as latency-sensitive. Both tool daemon 318 and host user interface 324 are coupled via VMX 312 to a per-vCPU latency requirement input 310. VMX 312 is a per-VM process running in user space that is an instantiation of the VM running in execution space 120.

VM management agent 134 302 receives per-vCPU latency requirements from input 310 and updates a vCPU latency_sensitivity_array 304. Host daemon 302 then provides array 304 to either off-line data structure 306 or on-line data structure 308, depending on whether a vCPU is not-running or running, respectively. Kernel scheduler 135 receives the information from on-line data structure 308 (a first data structure) and off-line data structure 306 (a second data structure) to select the pCPUs on which the vCPUs are to run. Thus, declaring that a vCPU is latency-sensitive can occur before the vCPU is running or while the vCPU is running.

FIG. 3B depicts the latency-sensitive array. The array includes a list for each VM. In each list, the entries for each vCPU in the VM, have a tag indicating whether the vCPU is running a latency-sensitive workload (e.g., time-critical workloads) or a normal, non-latency-sensitive workload. Thus, in the array for VM1, VCPU0, vCPU1, and vCPU5 are tagged as running latency-sensitive workloads whereas VCPU2, VCPU3, and vCPU4 are tagged as running normal workloads. As shown, each VM has its own latency-sensitive array for tagging the vCPUs of that VM.

Figure 4:
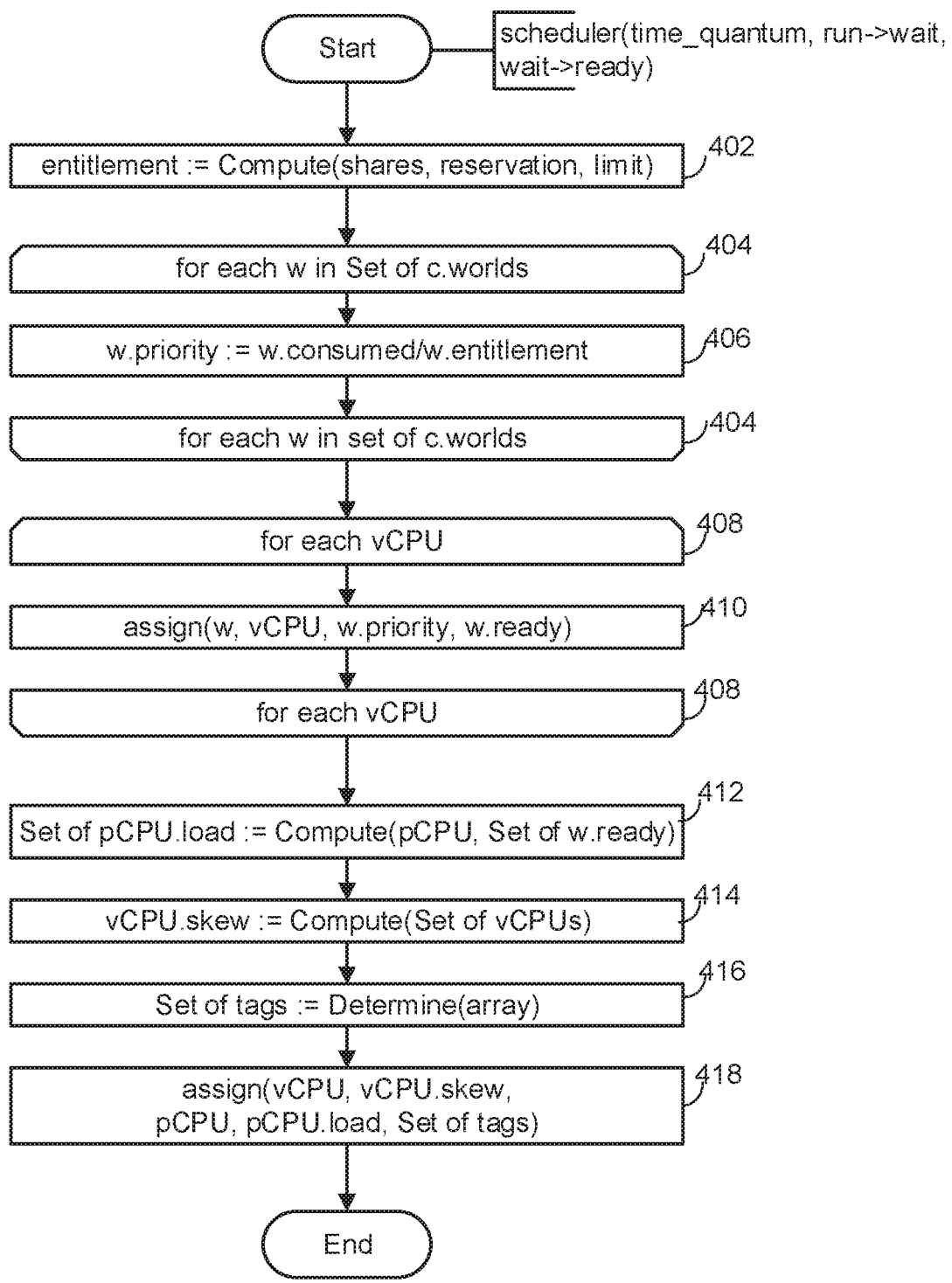
FIG. 4 depicts a flow chart of the scheduler depicted in FIG. 3.

FIG. 4 depicts a flow of operations for kernel scheduler 135 depicted in FIG. 3. Kernel scheduler 135 is invoked after handling an interrupt, when a time quantum expires, when a running world changes to waiting, or when a waiting world changes its state to ready, where a world is a schedulable execution context that runs on a vCPU and can include management tasks and user programs. In step 402, an entitlement quantity is computed based on shares, reservations, and limits. The shares are a user-provided parameter for requesting an amount of time a VM is allotted. The reservation is a guaranteed minimum allocation for a VM, and the limit is an upper bound of CPU resources that can be allocated to a VM. The ratio of the entitlement quantity and the actual consumption of CPU resources then determines the priority of the world, where priority is used by kernel scheduler 135 to select the next world to run, higher priority worlds running before lower priority worlds. In step 404, an iterator runs over all of the worlds and computes a priority value in step 406 for each world. In step 408, another iterator runs over all of the vCPUs of a VM and assigns a world to each vCPU in step 410 based on the world's priority and whether the world is ready to run. In step 412, kernel scheduler 135 determines a load on each pCPU. In step 414, kernel scheduler 135 computes the skew of each vCPU, where skew is the degree of difference in runtime between vCPUs. In step 416, kernel scheduler 135 determines a set of tags from the latency_sensitivity_array, where the tags are assigned to those vCPUs with latency-sensitive workloads. In step 418, kernel scheduler 135 assigns a vCPU to a pCPU based on the skew of the vCPU, the pCPU load, and the corresponding tag in the set of tags. Thus, the kernel scheduler takes into account the tags, representing the latency requirements, to make assignments of vCPUs to pCPUs. In this manner, instead of the VM determining the assignments of vCPUs to pCPUs, the individual workloads of each vCPU of the VM determine the assignments.

Figure 5:
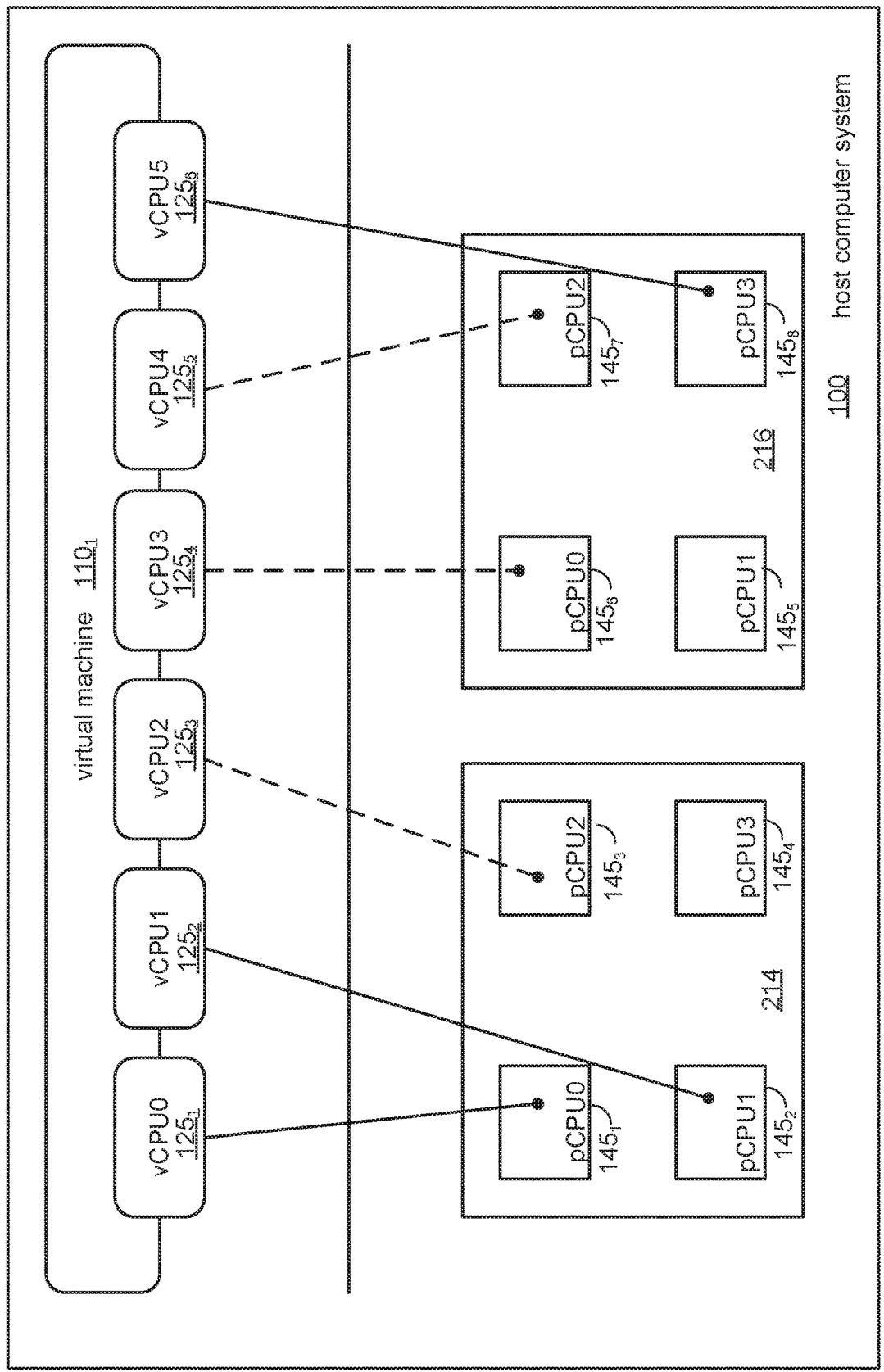
FIG. 5 depicts an example assignments of vCPUs to pCPUs, according to an embodiment.

FIG. 5 depicts an example assignment of vCPUs to pCPUs, according to an embodiment. As shown in Table 2 below, kernel scheduler 135 makes an assignment of vCPU2, vCPU3, and vCPU4 to pCPUs in a manner where reassignment is possible because these vCPUs do not run latency-sensitive workloads, while vCPU0, vCPU1, and VCPUs do run latency-sensitive workloads and their assignments to pCPUs are pinned to the pCPUs so that reassignment is not possible.

TABLE 2

| vCPU | Socket | pCPU | reassignment allowed? |
|---|---|---|---|
| vCPU0 $125_1$ | 214 | pCPU0 $145_1$ | No |
| vCPU1 $125_2$ | 214 | pCPU1 $145_2$ | No |
| vCPU2 $125_3$ | 214 | pCPU2 $145_3$ | Yes |
| vCPU3 $125_4$ | 216 | pCPU1 $145_6$ | Yes |
| vCPU4 $125_5$ | 216 | pCPU2 $145_7$ | Yes |
| vCPU5 $125_6$ | 216 | pCPU3 $145_8$ | No |

These assignments optimize latency at the vCPU level within a VM because the vCPUs are assigned based on the specific latencies of the workloads assigned to the vCPUs. Thus, the vCPUs $125_{1-6}$ within a VM $110_1$ handle both latency-sensitive and non-latency sensitive workloads and the vCPUs running non-latency sensitive workloads can be individually re-assigned at runtime to one or more different pCPUs if and when a vCPU with a latency-sensitive workload arises. This flexibility allows the system to run a greater number of latency-sensitive workloads because more pCPUs are available for latency-sensitive workloads than if all of the vCPUs of a VM were assigned on the basis of the latency requirements of the entire VM.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O. The term "virtualized computing instance," as used herein, is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of selectively assigning virtual CPUs (vCPUs) of a virtual machine (VM) to physical CPUs (pCPUs), wherein execution of the VM is supported by a hypervisor running on a hardware platform including the pCPUs, the method comprising:
    determining that a first vCPU of the vCPUs is scheduled to execute a first workload of the VM, wherein the first workload has been designated as being latency-sensitive and a second vCPU of the vCPUs is scheduled to execute a second workload of the VM, wherein the second workload has been designated as being non-latency-sensitive;
    making an assignment of the first vCPU to a first pCPU of the pCPUs and the second vCPU to a second pCPU of the pCPUs;
    causing the first workload to execute on the first vCPU and the second workload on the second vCPU, wherein a kernel component of the hypervisor pins the assignment of the first vCPU to the first pCPU and does not pin the assignment of the second vCPU to the second pCPU;
    determining, while the second vCPU is executing the second workload on the second pCPU, that the second vCPU is scheduled to execute a third workload that has been designated as being latency-sensitive; and
    re-assigning the second vCPU to a third pCPU such that the second vCPU cannot be re-assigned from the third pCPU to another pCPU of the pCPUs.

2. The method of claim 1, wherein the kernel component, during execution of the VM, is not permitted to re-assign the first vCPU to any pCPU of the pCPUs and is permitted to re-assign the second vCPU to another pCPU of the pCPUs.

3. The method of claim 2, wherein the kernel component, during execution of the VM, schedules another vCPU of the vCPUs to run on the second pCPU.

4. The method of claim 3, wherein said another vCPU is running a workload of another VM.

5. The method of claim 1, further comprising:
    selectively designating by tagging a plurality of workloads of the VM as latency-sensitive,
    wherein the first workload designated as latency-sensitive and the second workload is not designated as latency-sensitive.

6. A computer system comprising:
    a hardware platform that includes a plurality of physical CPUs (pCPUs); and
    a memory coupled to the pCPUs, wherein the memory has loaded therein a hypervisor which includes a kernel scheduler, and the hypervisor supports execution of one or more virtual machines (VMs), each of which includes a plurality of virtual CPUs (vCPUs), wherein
    when the kernel scheduler determines that a first vCPU of the vCPUs is scheduled to execute a first workload of a VM, wherein the first workload has been designated as being latency-sensitive and a second vCPU of the vCPUs is scheduled to execute a second workload of the VM, wherein the second workload has been designated as being non-latency-sensitive, the kernel scheduler makes an assignment of the first vCPU to a first pCPU of the pCPUs and the second vCPU to a second pCPU of the pCPUs, and causes the first workload to execute on the first vCPU and the second workload to execute on the second vCPU, wherein the assignment is such that, during execution of the VM, the kernel scheduler is not permitted to re-assign the first vCPU to any pCPU of the pCPUs and is permitted to re-assign the second vCPU to another pCPU of the pCPUs, and
    when the kernel scheduler determines, while the second vCPU is executing the second workload on the second pCPU, that the second vCPU is scheduled to execute a third workload that has been designated as being latency-sensitive, the kernel scheduler re-assigns the second vCPU to a third pCPU, while the second vCPU is executing, such that the second vCPU cannot be re-assigned from the third pCPU to another pCPU of the pCPUs.

7. The computer system of claim 6, wherein the kernel scheduler, during execution of the VM, schedules another vCPU of the vCPUs to run on the second pCPU.

8. The computer system of claim 7, wherein said another vCPU is running a workload of another VM.

9. The computer system of claim 6, wherein each of a plurality of workloads of the VM is designated as latency-sensitive or non-latency-sensitive by tagging, and the first workload is designated as latency-sensitive and the second workload is not designated as latency-sensitive.

10. A non-transitory computer-readable medium comprising instructions executable in a computer system having a hardware platform that includes a plurality of physical CPUs (pCPUs) and a memory having loaded therein the instructions which, when executed in the computer system, the computer system carries out a method of selectively assigning virtual CPUs (vCPUs) of a virtual machine (VM) running in the computer system to the pCPUs, said method comprising:
    determining that a first vCPU of the vCPUs is scheduled to execute a first workload of the VM, wherein the first workload has been designated as being latency-sensitive and a second vCPU of the vCPUs is scheduled to execute a second workload of the VM, wherein the second workload has been designated as being non-latency-sensitive;
    making an assignment of the first vCPU to a first pCPU of the pCPUs and the second vCPU to a second pCPU of the pCPUs;
    causing the first workload to execute on the first vCPU and the second workload on the second vCPU, wherein the assignment of the first vCPU is pinned to the first pCPU and the assignment of the second vCPU is not pinned to the second pCPU;

determining, while the second vCPU is executing the second workload on the second pCPU, that the second vCPU is scheduled to execute a third workload that has been designated as being latency-sensitive; and re-assigning the second vCPU to a third pCPU such that the second vCPU cannot be re-assigned from the third pCPU to another pCPU of the pCPUs.

11. The non-transitory computer-readable medium of claim 10, wherein during execution of the VM, the first vCPU is not permitted to be assigned to any pCPU of the pCPUs and the second vCPU is permitted to be assigned to another pCPU of the pCPUs.

12. The non-transitory computer-readable medium of claim 11, wherein during execution of the VM, another vCPU of the vCPUs is assigned to run on the second pCPU.

13. The non-transitory computer-readable medium of claim 12, wherein said another vCPU is running a workload of another VM.

14. The non-transitory computer-readable medium of claim 10, wherein each of a plurality of workloads of the VM is designated as latency-sensitive or non-latency-sensitive by tagging, and the first workload is designated as latency-sensitive and the second workload is not designated as latency-sensitive.

* * * * *